June 15, 1954 E. D. HILBURN 2,681,382

VIDEO RECORDING AND REPRODUCING

Filed Aug. 11, 1950 5 Sheets-Sheet 1

INVENTOR.
EARL D. HILBURN
BY Hyman Hurwitz
ATTORNEY

INVENTOR.
EARL D. HILBURN
BY Hyman Hurwitz
ATTORNEY

June 15, 1954 E. D. HILBURN 2,681,382

VIDEO RECORDING AND REPRODUCING

Filed Aug. 11, 1950 5 Sheets-Sheet 3

INVENTOR.
EARL D. HILBURN
BY Hyman Hurwitz
ATTORNEY

June 15, 1954 E. D. HILBURN 2,681,382

VIDEO RECORDING AND REPRODUCING

Filed Aug. 11, 1950

5 Sheets-Sheet 4

INVENTOR.
EARL D. HILBURN

BY Hyman Hurvitz

ATTORNEY

INVENTOR.
EARL D. HILBURN
BY
ATTORNEY

Patented June 15, 1954

2,681,382

UNITED STATES PATENT OFFICE 2,681,382

VIDEO RECORDING AND REPRODUCING

Earl D. Hilburn, Silver Spring, Md.

Application August 11, 1950, Serial No. 178,919

13 Claims. (Cl. 178—6.7)

The present invention relates generally to recording, and more particularly to recording large quantities of information, or wide band electrical signals, on a relatively small quantity of photo-sensitive tape. The invention finds particular application to the recording of electrical signals representative of a black and white or color television program.

It is a broad object of the present invention to provide a novel system for recording large quantities of information on relatively small quantities of photo-sensitive tape.

It is another object of the invention to provide a system for recording extensive television programs, in the form of electrical signals, on a relatively small quantity of photosensitive tape.

A further object of the invention resides in the provision of a system for recording color television signals on monochromatic film.

Still another object of the invention resides in the provision of a system for recording the entire content of a transmitted television program, including synchronizing and blanking signals, to enable re-transmission of the entire program, including the necessary synchronizing and blanking pulses, by a process of tape reading.

A further object of the invention resides in the provision of a system for recording wide band electrical signals, i. e., signals requiring a spectrum of over 2 megacycles for their effective representation.

A further object of the present invention resides in the provision of a system for recording on photo-sensitive tape by applying to the tape, in successive transverse scans, and while the tape feeds longitudinally, a variable width constant intensity light beam, and for reproducing the recording.

Another object of the invention resides in the provision of means for producing a scan of a cathode ray beam which is substantially linear in a first direction, and which in a second direction responds to an amplitude modulated high frequency carrier, or to a constant amplitude high frequency carrier, and for maintaining constant the brilliance of a luminous spot produced by the beam upon impinging on a fluorescent screen, despite variations in velocity of deviation of the beam in response to the carrier.

Another object of the invention resides in the provision of a system for recording and reproducing wide band signals on photo-sensitive tape by means of a cathode ray tube having two independent beam producing devices, which operate in alternation during each line scanned by the beam.

A further object of the invention resides in the provision of a system for recording on photo-sensitive tape, and for reproducing the recording, by scanning tranversely of the tape alternatively in opposite directions, and recording or reproducing at all times during the scans, and regardless of the directions of the scans transversely of the tape.

The above and still further features, objects and advantages of the invention will become apparent upon consideration of the folowindg detailed description of various specific embodiments thereof, especially when taken in conjunction with the accompanying drawings wherein:

Figure 1 is a block diagram of a system for recording television signals on a photo-sensitive tape, in successive transverse scans all in the same direction;

Figure 1*a* is a plan view of a tape portion, showing the appearance of recordings thereon;

Figures 2, 3A:
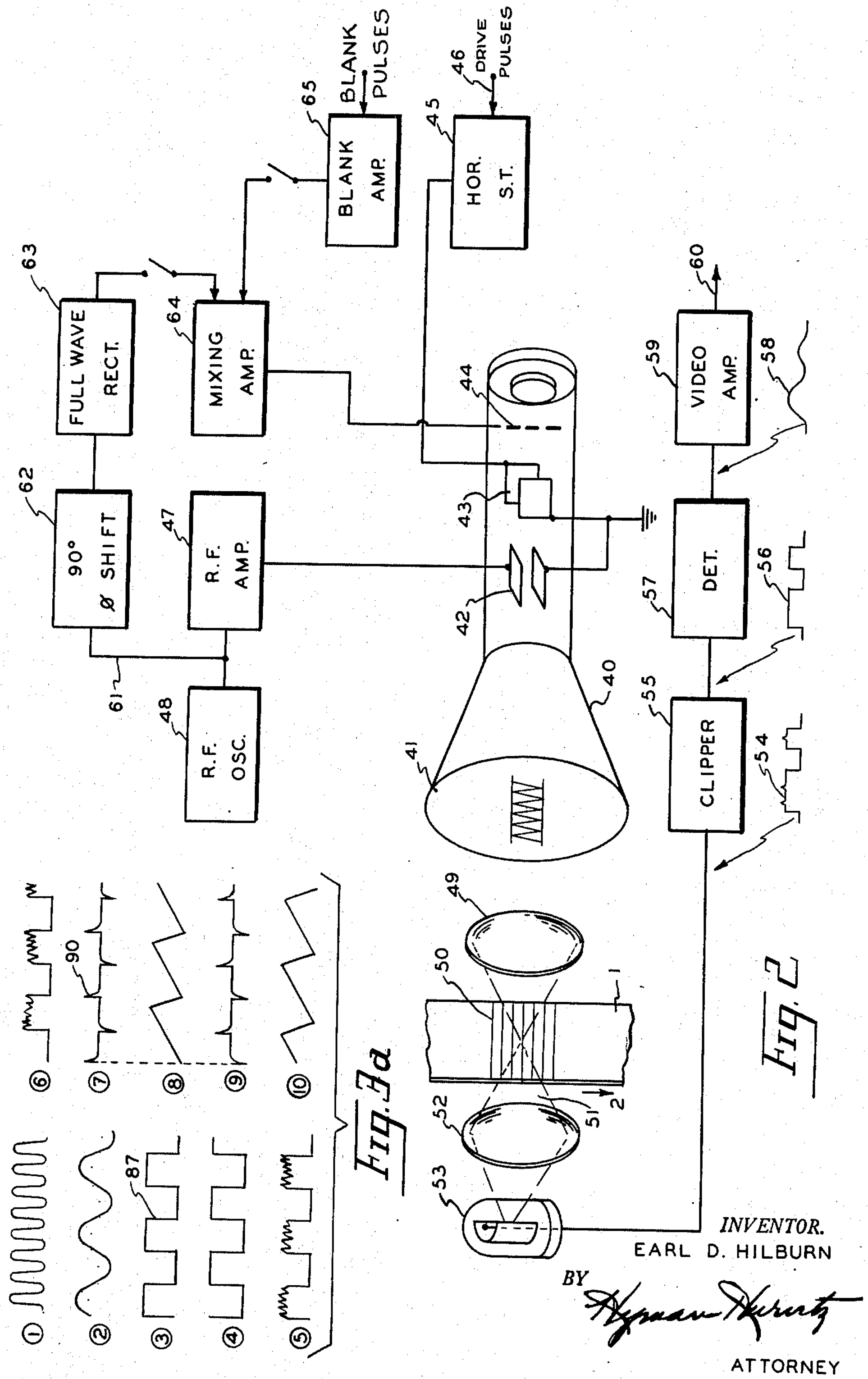
Figure 2 is a block diagram of a system for reading the photo-sensitve tape produced by the system of Figure 1.
Figure 3:
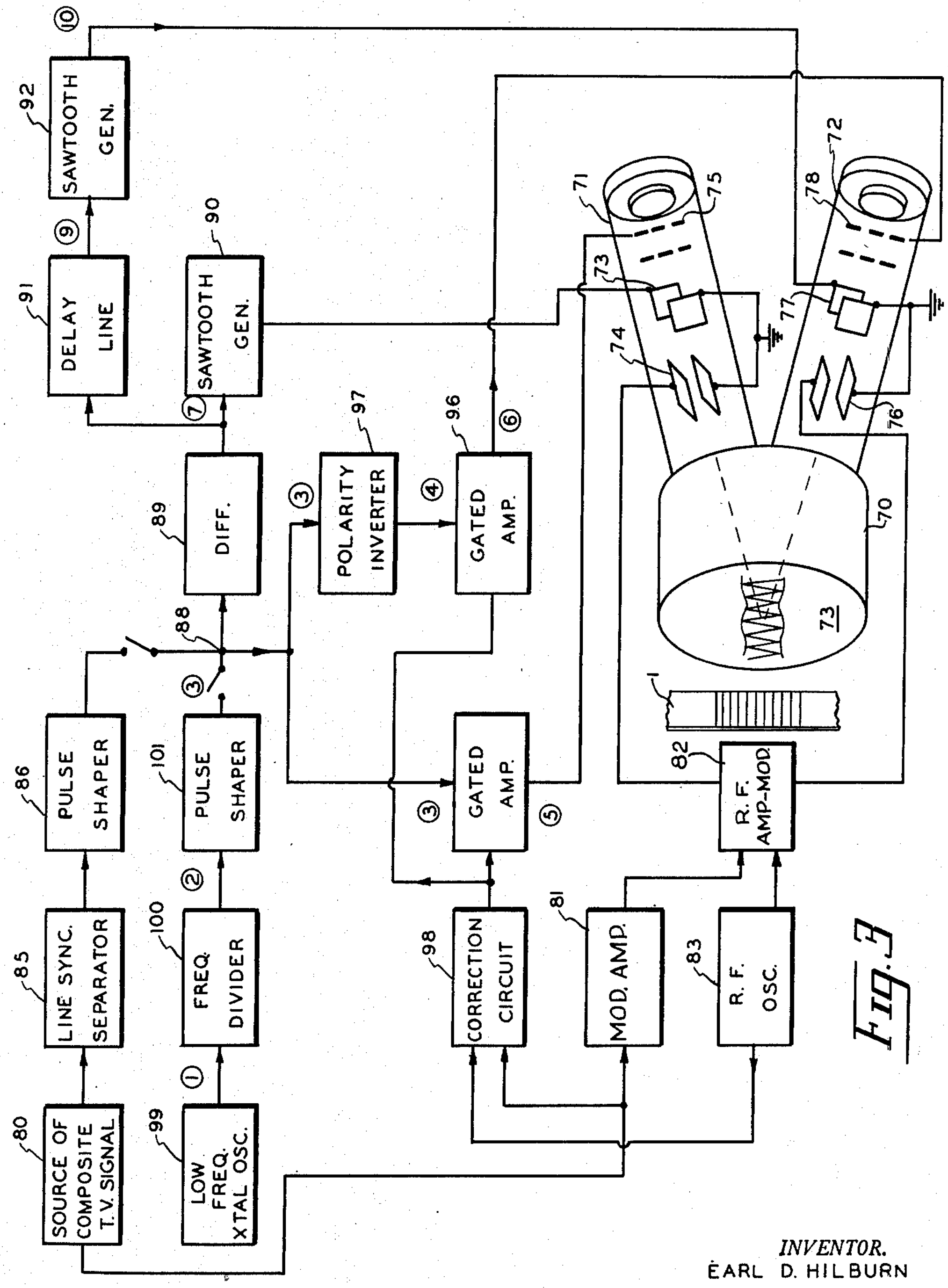
Figure 3 is a block diagram of a system for recording television signals in transverse scans of a longitudinally moving photo-sensitive film, utilizing a double gun cathode ray tube, for effecting continuous recordings without breaks due to the necessity for beam re-trace.
Figures 4, 5A, 5B, 5C:
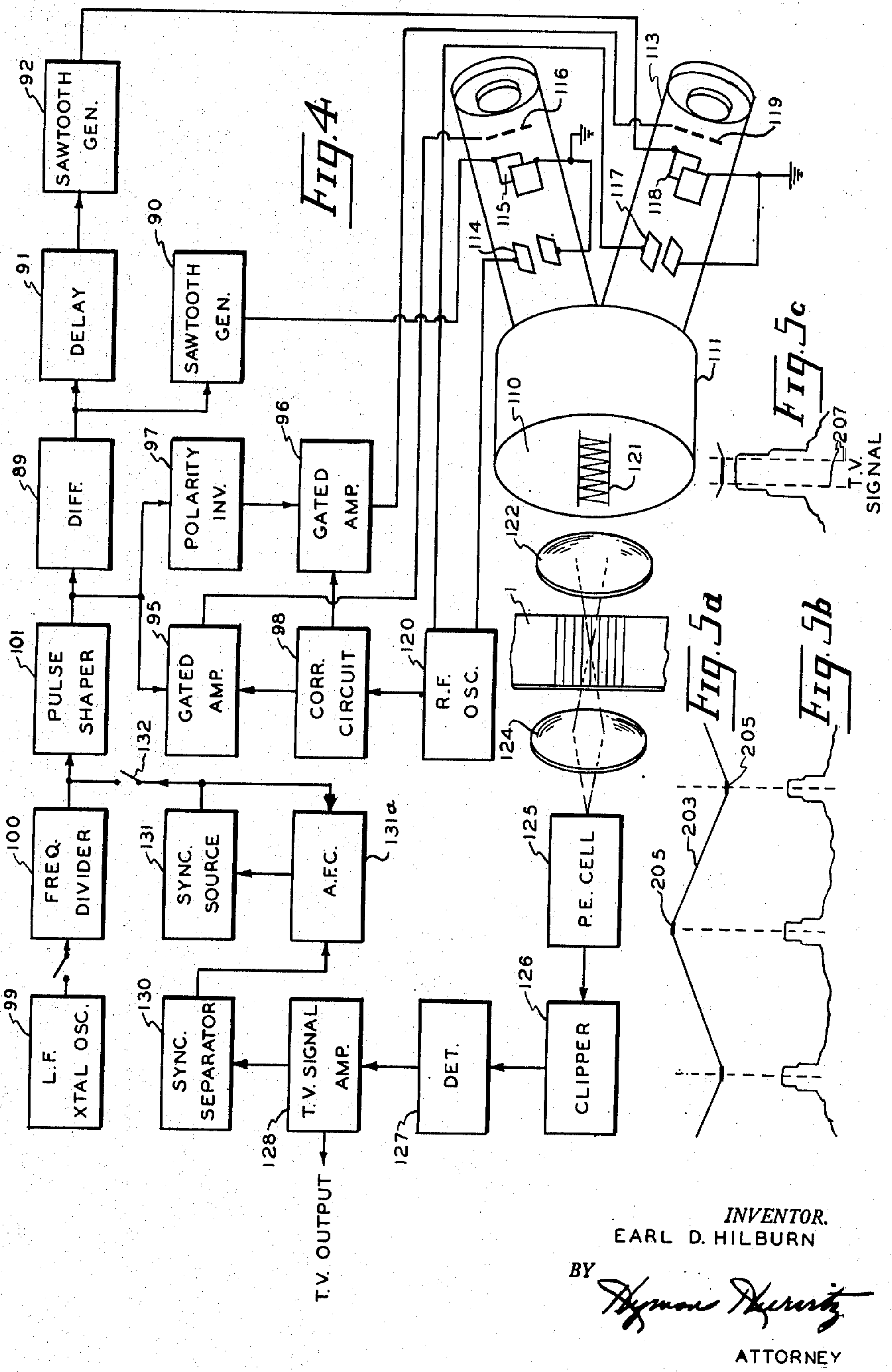
Figure 5:
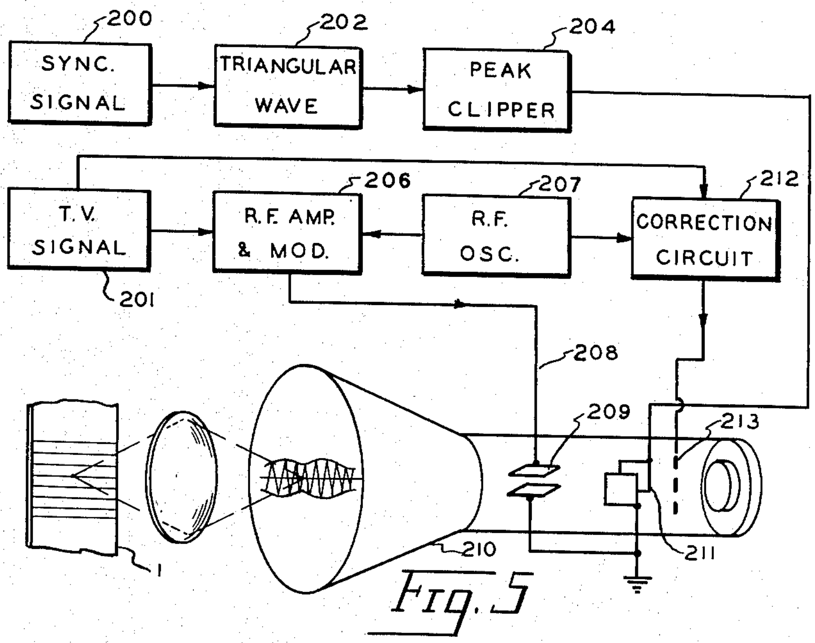
Figure 6:
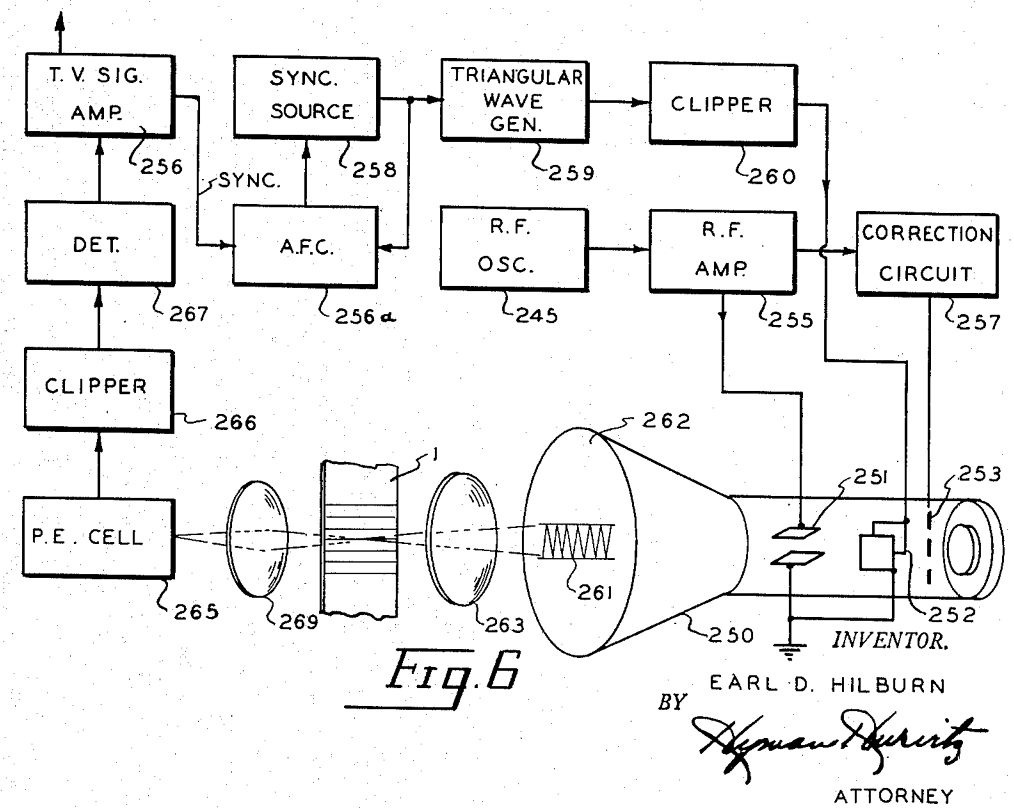

Figure 3*a* is a wave form diagram showing the character of voltages present in the system of Figure 3;

Figure 4 is a block diagram of a film reading system for reproducing television signals from a tape produced by the system of Figure 3;

Figure 5 is a block diagram of a modification of the present invention wherein continuous recordings, requiring no re-trace, are generated by transverse scans of a longitudinally moving photo-sensitive tape, by effecting the transverse scans similarly in opposite directions of scan alternatively; and Figures 5*a*–5*c*, inclusive, represent wave forms of voltage present in the system of Figure 5;

Figure 6 is a block diagram of a film reading system for reproducing television signals recorded by the system of Figure 5.

Briefly described, there is provided, in accordance with the presently described embodiments of the invention, a system for recording television signals or the like on a moving photo-sensitive tape. The tape is constrained to move uniformly in the direction of its length, or longitudinally, and recording takes place in successive variable width transverse lines across the tape, and is accomplished at constant intensity, by utilizing a flying spot generated by a cathode ray tube, which is itself of constant intensity. The flying spot is modulated in a vertical direction, i. e., parallel to the longitudinal motion of the film, in response to amplitude modulated carrier, the carrier being of constant frequency, and being amplitude modulated in response to a vidio signal. Successive transverse scans of the spot are accomplished in response to saw-tooth voltages generated by the sync signals of the television composite signal or by deriving pulses coincidentally produced by the synchronizing generator.

In a system of this character the flying spot cannot be maintained of constant intensity if the electron beam which produces the spot travels with sinusoidal motion, or with amplitude modulated sinusoidal motion. This is because the velocity of the electron beam, so traveling, is not constant, but varies both with its position on the sinusoid, and with the amplitude of the sinusoid, at each instant of time.

It is a feature of the present invention to modulate the intensity of the electron beam which generates the flying spot, at each instant of time, in such sense as to compensate for the varying velocity of scan of the beam, to maintain the spot intensity constant during the entire recording process.

The recording so produced is read or reproduced by means of a further flying light spot, generated by cathode ray beam impinging on a fluorescent screen, the light produced by the spot being caused to pass through the tape, to modulate its intensity, and thereafter falling upon a photo-cell which measures its intensity, as modulated by passage through the film. The flying spot is caused to scan transversely of the film by means of a saw-tooth voltage controlled by television sync signals, and is scanned in a direction parallel to film feed by means of a sinusoidal voltage with sufficient amplitude to assure complete coverage of the variable width track produced by the recording systems. Since in reproduction the electron beam which produces the flying spot is constrained to travel in sinusoidal motion, i. e., at variable rates, the spot intensity produced by a constant intensity electron beam would be variable. In accordance with a feature of the present invention, the intensity of the electron beam is modulated in such a manner as to maintain the intensity of the spot constant.

In the embodiment of my invention described immediately above the electron beam is blanked out during re-trace times between successive scans, all scans being in the same direction. For some purposes this may prove to be undesirable, since the recording then contains only the picture components of a composite television signal, and not the synchronizing or blanking components, whereby reproduction of the record does not result in a television signal capable of being broadcast, without more.

In accordance with a further embodiment of the invention, a two gun cathode ray tube is utilized for reproducing a flying spot, in accordance with the invention, both for recording and reproducing. During recording a carrier amplitude modulated by the composite TV signal, is applied to the vertical plates of both guns. The size and centering controls of the guns are adjusted in such a manner that if both guns unblanked the patterns of the two guns would be in register on the face of the tube, for a time during each scan. Continuous recording is then accomplished by utilizing the guns in succession to generate the flying spot, the beam produced by one gun being caused to re-trace while the other beam is generating the flying spot, and the latter beam being caused to re-trace while the first beam is generating the flying spot. In this manner, continuous recording is accomplished, while allowing for beam re-trace, and the recorded signals may include not only the video component of a composite television signal, but also the blanking and synchronizing components thereof. Reproduction is accomplished in an analogous manner.

In accordance with still a further feature of the invention, continuous recording, without the necessity for re-trace, is accomplished by utilizing a single beam cathode ray tube, and effecting horizontal scans of the beam in response to substantially a triangular scanning voltage, so that the beam scans alternatively in opposite directions, recording taking place at all times during both scans. Expedients are provided for minimizing overlap of the traces adjacent the positions where the traces reverse direction, by transiently slowing down or stopping the transverse scan at these positions, or by reducing the scan rate temporarily to zero at these positions, while the photi-sensitive film feeds longitudinally for a sufficient distance to prevent any substantial overlap of traces.

Figures 1, 1A:
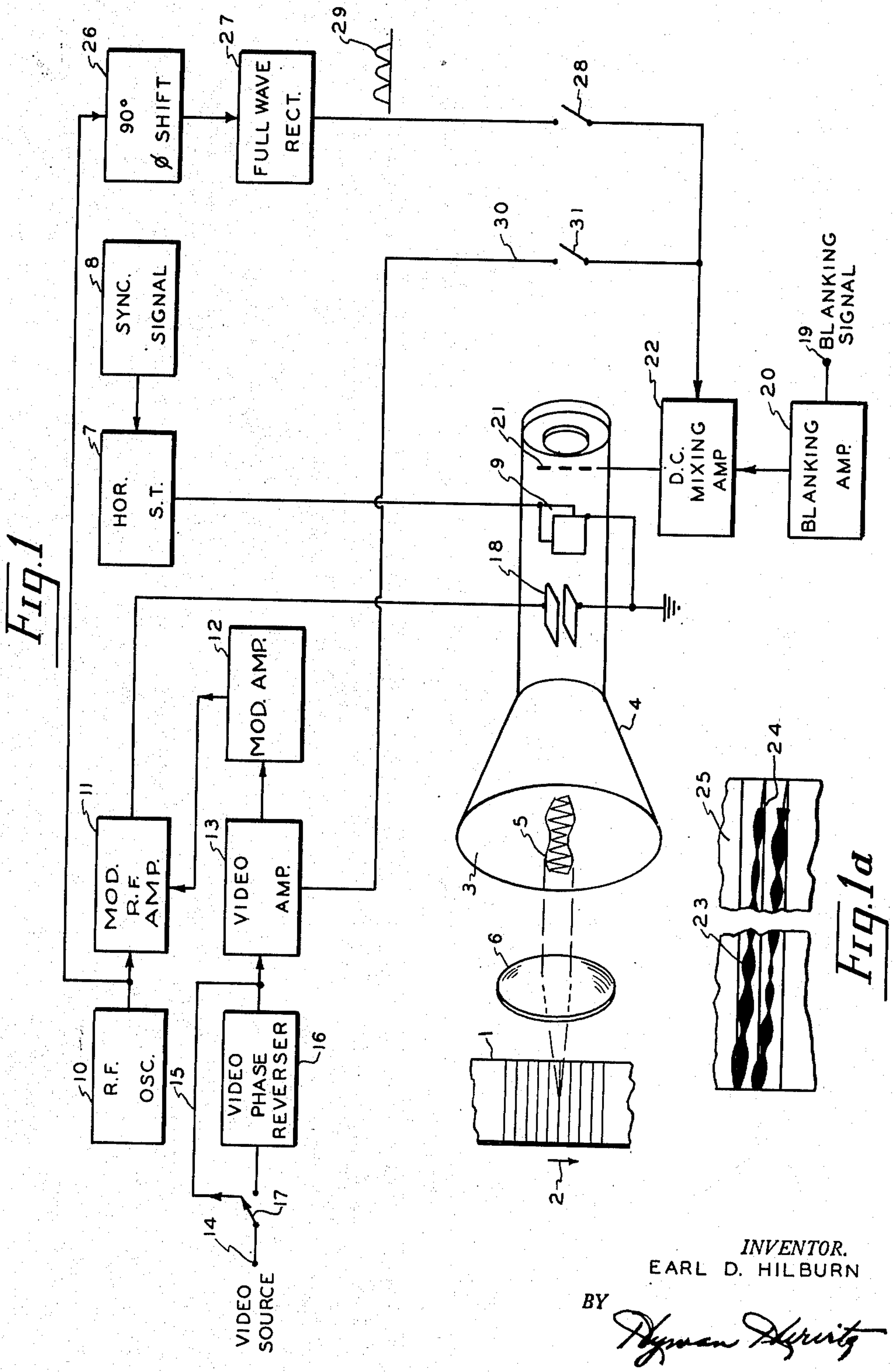

Reference is now made more particularly to Figure 1 of the accompanying drawings, wherein the reference numeral 1 denotes a strip of photo-sensitive film, which is fed uniformly in a longitudinal direction, or in the direction of the arrow 2.

Recording on the film is accomplished by means of a flying light spot generated on the face 3 of a cathode ray tube 4, by means of an electron beam which is caused to scan transversely of the film strip 1, and which is moved in the direction of film feed in response to a high frequency carrier which is modulated in amplitude by a video signal, to produce a trace roughly indicated at 5. The luminous trace is focused via a lens 6 on the film strip 1, to produce a constant intensity variable width recording.

Horizontal scans of the beam are produced by a saw-tooth generator 7, synchronized by means of synchronizing pulses derived from a composite television signal or from driving pulses coincidentally produced by a TV synchronizing generator, in a manner known per se, by means of a sync signal source indicated at 8. The saw-tooth voltage generated by generator 7 is applied to a horizontal deflection electrode 9 of the cathode ray tube 4. The radio frequency signal required for longitudinal deflection of the beam is produced by an R. F. oscillator 10 having a frequency at least several times the highest frequency to be recorded. The output of the R. F. oscillator 10 is amplified by means of a modulated R. F. amplifier 11, to which is applied amplitude modulating signals, by means of a modulating amplifier 12. The modulating signals are derived from a video amplifier 13, which may be supplied with such signals from a video source indicated by a terminal 14, and via a lead 15, or if desired via a video phase reverser 16, selection being made as between the lead 15 and the video phase reverser 16 by means of a manual switch 17. The modulated output of the R. F. amplifier 11 is then applied to a vertical deflection electrode 18 of cathode ray tube 4.

In the system as so far described, the beam of cathode ray tube 4 generates one trace during each line of a composite television picture, laterally of the face 3 of the tube 4. During this trace the beam is subjected to vertical deflection voltages at radio frequency, the amplitude of the deflections being determined by the video signal. If then, the photo-sensitive strip 1 feeds at a sufficiently rapid rate each line of the television picture will be recorded as a transverse line on the film, in terms of variable width recording.

At the end of each line it is essential to cause the beam to re-trace, preparatory to scanning of a further line of the picture. Re-trace is accomplished by the appropriate portion of the saw-tooth voltage generated by horizontal saw-tooth generator 7, and blanking is accomplished in response to television blanking signal, applied to a terminal 19, and derived from the television signal, or obtained directly from the television synchronizing generator, in a manner which is per se well known in the art. The blanking signal is amplified by means of a blanking amplifier 20 and applied to the control electrode 21 of cathode ray tube 4 via a D.-C. mixing amplifier 22, the function of which will appear as the description proceeds.

A recording will then take place in successive transverse lines on the film 1, these lines, however, not being truly horizontal because of the longitudinal movement of the film 1. The lines will then have a slight slope, as at 23, and a slight spacing as at 24, due to the fact that re-trace time, in the conventional television signal, represents about 15% of the total transmission time, and that the film strip 1 feeds continuously during this time. Re-trace occurs as at 25, in the intervals between recorded lines.

In accordance with the present invention reproduction of the record is accomplished by means of a scanning or flying spot, which measures the amplitudes of the traces 23, in terms of light transmission therethrough. It is desired that this measurement corresponds only with a measurement of amplitude of the trace, and not of its density. At the same time, in recording the trace, the intensity of the flying spot produced by the cathode ray tube 4 is not maintained constant, but there will be produced, on the film 1, in the absence of compensation, a recording of variable width, containing variations of density due to variations of scanning speed of the beam. It is essential to maintain constant the intensity of the flying spot, during its excursions, both during recording and reproduction, and this despite the fact that the beam creating the flying spot has a continually varying velocity, and that the amount of light produced in response to the beam at each instant is a function not only of its intensity, but also of its velocity.

The variations in velocity occur for two reasons. In the first place, the cathode ray beam, which is deflected in response to a sinusoidal voltage, has almost zero velocity at the peaks of the voltage, and maximum velocity at the zero points of the voltage, and intermediate velocities at intermediate points of the voltage. In the second place, if the sinusoidal wave is amplitude modulated, the beam must travel faster, on the average, when the peak values of the wave are greater, and slower when they are smaller. It accordingly becomes essential to introduce into the present system a correction factor for varying the variable scanning velocity of the beam which generates the flying light spot.

Variation of beam intensity in such manner as to compensate for variable velocity of scan, is accomplished as follows. The output of R. F. oscillator 10 is applied to a 90° phase shift circuit 26. The output of the latter is applied to a full wave rectifier 27, and the output of the latter is applied via a manual switch 28 to the D.-C. mixing amplifier 22, whence it is applied to the intensity control electrode 21 of the cathode ray tube 4. The shape of the full wave rectified voltage produced by the rectifier 27 is indicated at 29, and it will be clear that the zero points of this voltage occur at the peaks of the output of the R. F. oscillator 10, whether these peaks be positive or negative. Accordingly, at these points, during which the beam of the cathode ray tube 4 is stationary, the total correction voltage applied to the control electrode 21 is zero. As the beam follows the sinusoidal deflection voltage, and increases in velocity at a sinusoidal rate, the amplitude of the correction voltage 29 similarly increases, and this voltage being applied to the control electrode 21 increases the intensity of the beam. The relative values of amplitude of the voltage 29, and velocity of the beam, may be so adjusted as to compensate fully for variations of beam velocity due to the sinusoidal nature of the scanning voltage.

There remains to correct for the variations of amplitude of the sinusoidal voltage. This is accomplished by deriving a control voltage from the video amplifier 13 via a lead 30, the voltage being applied by a switch 31 to the D.-C. mixing amplifier 22 and thence to the control electrode 21. Since the beam of the cathode ray tube 4 travels faster for higher amplitude video signals, the output of video amplifier 13 is applied as a voltage in phase with the video signal to the control electrode 21, intensifying the beam in proportion to the amplitude of the video signal, and accordingly in proportion to the increase in beam velocity caused by the higher amplitude of the sinusoidal deflection voltages.

In order to reproduce the signals recorded on the tape 1, the tape is fed longitudinally, at the same rate as during the recording process, and a flying spot generated by vertical scanning of a cathode ray beam in response to R. F. oscillations, horizontal scanning being established at such rate as to enable the successive recorded lines on the film 1 to be reproduced, i. e., at line repetition rate.

The flying light spot is caused to pass through the film 1, scanning the successive recorded lines thereof, and the vertical amplitude of the deflections is arranged to be sufficiently great to assure that the total width of the recorded lines is scanned over during each vertical scan. The light generated by the flying spot is caused to pass through the film 1, and is modulated in amplitude by the recordings thereon, thereafter falling on a photo-cell, which interprets these variations as a video signal.

The flying spot is produced by means of a cathode ray tube 40 having an extremely fast screen 41, and having vertical deflection electrodes 42, horizontal deflection electrodes 43, and an intensity control electrode 44. Horizontal deflection of the beam is accomplished in response to a saw-tooth voltage generated by a horizontal saw-tooth generator 45 driven by synchronizing pulses available on terminal 46, and having the normal line frequency of a television picture. Vertical deflection is accomplished in response to the output of an R. F. amplifier 47, which is driven by an R. F. oscillator 48, having the same frequency as the R. F. oscillator 10, or substantially this frequency. The total height of the vertical deflections is arranged to be sufficient, when focused by means of a lens 49 on the successive lines 50 recorded on the film 1, to traverse the width of the lines successively at the rate of the R. F. oscillator 48, passing beyond the upper and lower limits of the recorded lines during each vertical traverse.

While passing through a portion of the film on which a recording exists, the total amount of light passing through the film may become zero, or some fixed greater amount. When passing through a portion of the film on which no recording exists, a high intensity light may pass through the film. The light, accordingly, after passage through the film, is modulated on and off, or as pulses of greater and lesser amplitude, but possesses no intermediate values, except such as occur accidentally, and are undesired or represent noise. The light, after passage through the film 1, diverges as at 41, and is re-focused by a lens 52 on to a photo-cell 53. Variations in light falling on the photo-cell 53 give rise to voltage pulses of variable duration at its output, as illustrated at 54. These are clipped by a clipper 55, to reduce or remove random variations in amplitude, which are representative of noise, and the clipped pulses, shown at 56, are applied to a detector 57, of known character per se, which translates the duration modulated pulses 56 into an amplitude modulated video signal, as at 58. The latter is then amplified by a video amplifier 59 and transferred to a lead 60 for application as desired.

The above method of converting the recorded pattern into an electrical signal is preferred in view of its ability to discriminate against incidental amplitude fluctuations in the light reaching the photo-cell, such as may be caused by scratches or dirt on the record. Accordingly, this reading method employing pulse-width detection is described throughout. It is not to be assumed that for certain applications it might not be satisfactory to employ a somewhat simpler procedure. Such a simplification might employ a very high frequency oscillator, at 48, several times the frequency of the oscillator used in the recorder, so that the rate of vertical deflection would be such that the persistence of the screen material would cause the spot to spread into a vertical line. With a vertical line or band moving at constant velocity across the area to be scanned a current fluctuation in the photo-cell output would reproduce directly the wave form of the original intelligence signal recorded rather than the width-modulated pulse train produced by the spot scanning method. In this event the clipper 55 and the detector 57 would be omitted.

As in the recording system, so in the reproducing system, it is essential to provide a constant intensity flying light spot, despite the fact that the velocity of scan of the cathode ray beam which produces the light spot is not constant, due to the sinusoidal character of the deviations of the beam. Compensation is effected as in the system of Figure 1, by deriving from the R. F. oscillator 48 some of its output, on a lead 61, phase shifting this output 90° in a phase shifter 62, full wave rectifying the phase shifted output in a full wave rectifier 63, and applying the full wave rectified output via a mixing amplifier 64 to the intensity control grid 44 of the cathode ray tube 40. There may also be applied to this mixing amplifier blanking pulses provided by a blanking amplifier 65, the blanking pulses being tied to the driving pulses provided at the terminal 46, as is common in present day television technique. The manner in which the intensity control provided by the output of the full wave rectifier 63 operates to compensate for variations in velocity of scan of the beam of the cathode ray tube 40 will be apparent from the explanation of this phenomenon provided in the explanation of the system of Figure 1.

It will be clear that, to a first approximation, correction of beam intensity for variations of scan velocity is not required, either in recording or reproducing, and that if applied, such application may be limited to either reproducing or recording, but not necessarily to both, and may be applied in recording only in respect to variations of scan velocity due to video amplitude variations, and not in respect to variations of scan due to the sinusoidal character of the scan. The complete system as illustrated, and with all corrections employed, may be employed when extreme accuracy is desired.

When reproducing is accomplished utilizing a relatively slow phosphor, so that luminosity persists over several cycles of the R. F. carrier, correction for sinusoidal scan velocity is of relatively minor interest since the reproducer then essentially averages the height and intensity of the recorded trace. Correction due to variations of video amplitude are desirable, however, in recording for reproduction with either the slower or faster phosphor, since the time required to complete an R. F. cycle is the same regardless of R. F. amplitude, and therefore, the average of the height and intensity of the recording is unduly low for high intensity video signals, due to a decrease of average intensity during recording because of the faster scan.

The remarks contained in the two preceding paragraphs apply to all embodiments of the invention, but will not be repeated in the descriptions of the remaining embodiments, to avoid prolixity.

Reference is now made to Figure 3 of the accompanying drawings wherein is illustrated a system for recording the complete composite television signal, including not only the video components but also the blanking and synchronizing components, recording occurring for 100% of the time, and without intervals during which no recording occurs in order to permit re-trace of the cathode ray beam of the recording and reproducing devices.

The system of Figure 3 is accordingly of particular value in connection with color television systems, since it enables the recording of picture components required for generating and synchronizing the entire production of a color television picture, or black and white film regardless of whether that picture is produced in terms of sequential fields, frames, lines or dots. Retransmission of the color television picture requires, then, merely reproduction of the record on a film, with no extraneous signals of any kind.

In the system of Figure 3 recording is accomplished on a photo-sensitive film in successive variable width constant density transverse lines, as in the system of Figure 1, but such recording is accomplished in response to a flying spot pattern generated by a cathode ray tube 70 having two guns 71 and 72, which may hereinafter some-times be referred to as a gun #1 and gun #2, respectively. The size and centering controls for the two guns, not illustrated, may be adjusted to establish registry of the patterns produced by the two guns on the face 73 of the cathode ray tube 70, over a considerable portion of their scans, the guns being gated, however, so that only one is operative at any one time. Accordingly, by gating the two guns on and off alternatively, a complete scan may be generated on the face 73 of the cathode ray tube 70 in response to the electron beams generated by both guns, one gun taking over where the other leaves off.

The gun 71 is provided with vertical deflection electrodes 74, horizontal deflection electrodes 73 and intensity control electrode 75 and the gun 72 is provided with vertical deflection electrodes 76, horizontal deflection electrodes 77 and an intensity control electrode 78. A source of composite T–V signals 80 may be provided, from which may be derived the entire or composite T–V signal, including blanking and synchronizing components thereof. This signal is applied to a modulating amplifier 81, which modulates the amplitude of the output of an R. F. amplifier-modulator 82, the latter being driven from an R. F. oscillator 83, having a frequency at least several times greater than the highest frequency desired to be recorded. The amplitude modulated output of the R. F. amplifier-modulator 82 is applied in parallel to the vertical deflection electrodes 74 of 76 of the guns 71 and 72 respectively. Accordingly, both guns are subjected to identical vertical deflection voltages.

There is derived from the source 80 of composite T–V signals, by means of a line synchronizing signal separator 85, line synchronizing pulses, or end of line pulses. These pulses are applied to a pulse shaper 86, which provides at its output rectangular waves as at 87, one cycle of each rectangular wave corresponding in time with the duration of a line. The rectangular waves may be applied via a manual switch to a junction point 88. Connected to the junction point 88 is a differentiator 89, which produces at its output sharp pulses as at 90, the positive going pulses corresponding with the rise of the wave form 87 and the negative going pulses corresponding with the fall of wave form 87. These pulses are applied without delay to a saw-tooth generator 90, and via a delay line 91 to a further saw-tooth generator 92. The saw-tooth output of the saw-tooth generator 90 is applied to the horizontal deflection electrodes 73 of the gun 71 while the delayed saw-tooth voltage provided by the saw-tooth generator 92 is applied to the horizontal deflection electrodes 77 of the gun 72. The delay time of the delay line 91 is relatively arbitrary, but may be assumed, for the sake of example in explaining the present embodiment of my invention, to be equal to one-third the duration of a line of the picture. Further, for the sake of example, saw-tooth output of the saw-tooth generator 90 may be assumed to commence a trace at the zero point of a line of the picture and to terminate the trace at two-thirds of the distance along the line, while the saw-tooth generator 92 may be assumed to commence its trace at a point one-third the distance along the line and to continue its trace to the end of the line. Accordingly, were the two guns 71 and 72 to be unblanked at all times, gun 1 would provide a pattern for one-third of a line, guns 1 and 2 would provide a pattern for the succeeding one-third of a line, and gun 2 alone would then complete the pattern for the remaining one-third of a line. As has been stated hereinbefore adjustment of the trace must be made so that the traces are in register while they overlap. It will be further clear that the specific values suggested in this paragraph are arbitrary.

The rectangular waves available at the terminal 88 are applied as gating waves to a pair of gated amplifiers 95, 96, and are applied directly to the gated amplifier 95, but only after phase reversal in a polarity inverter 97, to the gated amplifier 96. The output of gated amplifier 95 is applied to intensity control electrode 75, while the output of gated amplifier 96 is applied to intensity control electrode 78. If it be assumed, for the sake of example, that the rectangular wave 87 contains positive and negative portions of equal durations, the gun 71 will then be on for half a line duration, the gun 72 being blanked out during this period, and for the remaining half line the gun 71 will be blanked out while the gun 72 is on. Since the patterns produced by the two guns would be in register, were they unblanked, at the point of transition of the gating waves, it will be clear that a complete pattern will be generated on the face 73 of the cathode ray tube indicator 70, half due to the gun 71 and half due to the gun 72, and that each gun will have ample re-trace time while the other gun is producing its assigned portion of the pattern.

Since, in the system of Figure 3, as in the system of Figure 1, correction may be required for variable velocity of the electron beams provided by the guns 71 and 72, a correction circuit 98 is provided, to which is applied a composite T–V signal provided by the source 80, and the output of the R. F. oscillator 83.

The correction circuit 98, contains, then, the necessary elements for generating a correction signal, and specifically contains a 90° phase shifter and full wave rectifier for the output of the R. F. oscillator 83, and a mixing amplifier 84 for combining with the full wave rectified voltage, so developed, the output of the R. F. modulated signal which determines the vertical amplitude of the pattern produced on the face 73 of the cathode ray tube indicator 70.

The system shown in Figure 3 may be applied for the recording of monochromatic or color television signals in toto, but may find other applications and uses, as for example, for recording pulse-time or pulse-position modulated multiplex signals, or radar signals, or even voice or audio signals, and in such case end of line signals may not be provided inherently in the signal being recorded. I may then provide an auxiliary source of such pulses, comprising a low frequency crystal oscillator 99, which drives a frequency divider 100, the output of which is at the desired frequency for the recording lines. The output of the frequency divider 100 may then be applied to a pulse shaper 101, which generates the wave shape 87, in known manner.

Reference is now made to Figure 4 of the accompanying drawings, wherein is illustrated a reproducing system for reproducing signals recorded by the system of Figure 3.

Reproduction is accomplished by generating a pattern on the fluorescent face 110 of the cathode ray tube 111, having two guns 112 and 113, the gun 112 comprising vertical deflection electrodes 114, horizontal deflection electrodes 115 and an intensity control electrode 116, while the gun 113 comprises vertical deflection electrodes 117, horizontal deflection electrodes 118 and intensity control electrode 119. There may be applied to both vertical electrodes 114 and 117 the output of an R. F. oscillator 120, having the same frequency or substantially the same frequency as the R. F. oscillator 83, in Figure 3. Similarly there may be provided a low frequency crystal oscillator 99, a frequency divider 100 a pulse shaper 101, a differentiator 89, a delay line 91, a saw-tooth generator 92, a gated amplifier 95, a gated amplifier 96, a polarity inverter 97, all as in the system of Figure 3, and all operating as do the corresponding elements in Figure 3. Accordingly, a pattern of uniform amplitude 121 is generated on the face 110 of the cathode ray tube indicator 111, in precisely the same way as the similar pattern of non-uniform amplitude is generated on the face 73 of the cathode ray tube indicator 70. The output of the R. F. oscillator 120 may be applied to a correction circuit 98, as in Figure 3, with the difference that the correction circuit 98 in Figure 4 need not be supplied with T–V signals, since the trace 121 is of uniform amplitude.

The trace 121 is focused on the moving film 1 by means of a lens 122, passes therethrough, and is then re-focused by means of a lens 124 on a photocell 125. The output of the latter is clipped by a clipper 126 and detected by a detector 127, the function of which is to convert the pulse length modulated outputs of the clipper 126 into amplitude modulated signals. The amplitude modulated signals provided by the detector 127 are amplified by means of an amplifier 128, at the output of which is then provided the entire T–V output, including video and synchronizing and blanking components.

When the system of Figure 4 is utilized for reproducing television signals, it is necessary to synchronize end of lines. This may be accomplished in the present system by deriving from the T–V signal output provided by the amplifier 128, the end of line synchronizing signals, by means of a synchronizing separator 130. These signals may then be utilized to control the phase and frequency of a synchronizing source 131, via an A. F. C. circuit 131*a*, of the "synchrolock" or "synchroguide" type, and the output of the source 131 may then be applied via manual switch 132 to the pulse shaper 101, taking the place of the sine waves provided by the frequency divider 100, the latter utilized when the system is utilized for reproducing signals which do not inherently include synchronizing components.

Referring now to Figure 5 of the accompanying drawings the reference numeral 200 represents a source of synchronizing signal, while the reference numeral 201 identifies a source of complete composite T–V signal. A source 202 of triangular waves as 203 is provided, which is synchronized in response to the synchronizing signals provided by the source 200, in such manner that the peaks of the triangular waves occur precisely at the synchronized times. The peaks are clipped from the triangular waves 203 by a peak clipper 204 so that the resultant wave contains clipped or flat portions 205.

The T–V signal provided by the source 201, and which comprises video blanking and synchronized components, is applied to an R. F. amplifier and modulator, to which is also applied the output of an R. F. oscillator 207, having a frequency several times greater than the highest frequency present in the T–V signal. The T–V signal then modulates the amplitude of the output of the R. F. oscillator 207, and the modulated output, present on the lead 208 outgoing from the R. F. amplifier modulator 206, is applied to the vertical deflection electrodes 209 of the cathode ray tube 210. The triangular waves 203, 205, available at the output of peak clipper 204, are applied to the horizontal deflection electrodes 211 of a cathode ray tube 210. Compensation is effected for the variable velocity of sweep and deflection of the beam of the cathode ray tube 210 by means of a correction circuit 212 to which are applied correction voltages deriving from R. F. oscillator 207 and T–V signal source 201, as in the system of Figure 3, the output of correction circuit 212 being applied to the intensity control electrode 213 of cathode ray tube 210, to increase the intensity of the cathode ray beam in accordance with increases of sweep velocity of the beam.

Since the beam is deflected transversely of the film 1 by means of a triangular wave 203, 205, the beam deflects transversely of the film 1 first in one direction and then in the opposite direction, always at uniform speed, except at the clipped portions 205 of the triangular wave 203. At these portions the beam is essentially stopped, so that the synchronized signal, which normally consumes 8% of the total duration of each line of a television picture, consumes far less than this on the actual recording.

Since the synchronized signal, which normally would consume 8% of the recorded portion of line on the film 1, is condensed in accordance with my invention, so that it actually consumes say 1% of such recorded distance, overlap of successive recorded lines going in opposite directions is minimized, and such overlap as does occur, occurs only in respect to synchronized signal, which has no fluctuation in amplitude as transmitted, in any event, and which carries no modulation. By providing a similar dwell in the scanning wave of the reproducer, the recorded synchronized signal may be stretched in time when reproduced, so that the reproduced synchronized signal is of normal duration.

The relationship between the scanning wave 203, with its dwell or clipped portions 205, and the composite T–V signal provided by the source 201, is illustrated at Figure 5*b*, where it is shown that the synchronized peaks occur synchronously with the dwells 205. The relationship is more clearly shown in Figure 5*c*, which shows in amplified relation the dwell 205 of a saw-tooth wave 203 and the synchronized signal, front and back blanking porches, and a portion of the modulation, of the composite T–V signal. It will be seen that the synchronized signal commences just prior to the dwell 205, and terminates just after the dwell 205 terminates. Since the beam of the cathode ray tube 210 does not move during the dwell 205, that portion of the synchronized signal existing between the dash lines 207 do not produce any additional recording on the film 1, in terms of extent of recording, although there is some additional blackening of the film due to the long duration of the beam of the cathode ray tube 210 on the film 1 during this period.

In Figure 6 is illustrated a reproducer for reproducing signals recorded by the system of Figure 5. In the system of Figure 6, it is essential first to initiate the recording process, by causing a few horizontal sweeps of the beam of the reproducing cathode ray tube 250 to take place. Thereby a few cycles of reproduced T–V composite signals are generated, which appear in the system, and prime the same for continued operation. With this proviso the cathode ray tube 250, as illustrated, contains vertical deflection electrodes 251, horizontal deflection electrodes 252, and an intensity control electrode 253. There is applied to the vertical deflection electrode 251 R. F. oscillations, deriving from an R. F. oscillator 254 and a cascaded R. F. amplifier 255. The output of the R. F. amplifier 255 is applied to a correction circuit 257 the output of which is applied to intensity control electrode 253. The nature of the correction circuit, which has been explained hereinabove, and which accordingly need not be repeated herein, is such that the intensity of the electron beam generated by the cathode ray tube 250 is varied to compensate for variations of beam deviation velocity.

Synchronizing signals are separated from the composite T–V signal provided by amplifier 256, as applied to A. F. C. circuit 256a which serves to synchronize the output of a synchronizing source 258, by comparison of synchronized pulse time. Synchronizing source 258 drives a triangular wave generator 259, the peaks of which, both positive and negative, occur in synchronism with the synchronized signals. The peaks of the triangular waves are clipped in a clipper 260, and the clipped triangular waves are then applied to the horizontal deflection electrodes 252. Accordingly, horizontal deflection of the beam of the cathode ray tube indicator tube 250 occurs precisely as during recording (by the system of Figure 5), and the required transverse scanning in two directions alternatively, with a dwell during reproduction of synchronizing signals at the termination of each scan, is accomplished.

The pattern 261 produced on the face 262 of the cathode ray tube 250 is applied via a lens 263 to the film 1, as a moving spot. The moving spot passes through the film, being modulated on or off during such passage, and then is focused by means of a lens 264 on a photoelectric cell 265. An amplitude clipper 266 is connected to the output of photo-electic cell, to clip random variations in amplitude of the signal deriving from the signal, the output of the clipper 266 being then a pulse duration modulated D.-C. signal. This signal is detected by a detector 267, the function of which is to translate the duration modulated pulses into amplitude modulated signals. These are applied to the T–V signal amplifier 256, at the output of which is then available the desired T–V signal, including video blanking and synchronizing components.

In the system of Figures 5 and 6 the character of the T–V signal is not material, since all components thereof are recorded and reproduced, and the signal, may if desired, be a color television signal, either of the frame sequential, field sequential, line sequential or dot sequential types.

There has not been discussed hereinbefore the question of transmitting sound signals together with T–V signals. This may obviously be accomplished in conventional manner by recording sound signals on one edge of the film 1, and reproducing these signals in known fashion. Any convenient system of recording and reproducing sound for this purpose may be adopted. Additionally, it is essential, in the present system, to accomplish uniform tape feed, at accurately controlled velocities. A large number of devices for accomplishing this are well known in the art, one of these involving the recording of control signals on the tape itself, and the reproduction of these control signals and their utilization for tape speed control during reproduction. In a system of the latter character the speed of the tape during recording is not of primary importance, since the speed of the tape on reproduction is caused to duplicate any variations of speed which occur during the recording process.

The present invention has, as a primary advantage, the fact that color television pictures may be recorded on monochromatic film, without in any way distorting color balance or fidelity of the original picture signal. The system has additional advantages in that gradations of shading of the actual picture being transmitted, whether color or black and white, need not be included as gradations in density of the film. To accomplish the latter object without distortion of tonal values of the picture signal is extremely difficult for many reasons. In the present system, however, the recording is of the variable area or variable width type, so that there results greater freedom from wave form distortion, less effect due to film processing variations, and there is enabled the use of high contrast, finer grained, film stock than must be used for variable density recording.

In addition to the above advantages, the recording and reproducing system described has the further advantage of greatly reducing disturbances in the output signal due to scratches on the film, dirt, fingerprints, etc.

Cathode ray tube devices for generating flying spots at the necessary velocities are available, and fluorescent screens having the sufficienty rapid decay times, of the order of .05 microsecond, are also available. One such phosphor is the P15 phosphor, which omits radiation in two light bands. One (the lesser peak) is in the blue-green region (at 5,000 Å.) and this phosphorescent light decays to 30% of its initial value at 1.5 microseconds. The second and higher intensity peak is in the invisible, near ultraviolet, centering at about 3800 Å., and is much shorter in persistence, having a time constant of less than .05 microsecond. Obviously, a mixture of the two lights may be used, or if only the shortest screen persistence is desired an ultraviolet filter may be used. These filters would transmit 90 to 97% of the light of the short persistence color and less than 2% of the longer persistence unwanted light.

With regard to screen brightness, it should be remembered that since a large cathode ray tube is to be used, having a diameter of 5 to 10 times the working width of the film, it will be comparatively simple to use a very fast lens system for exposing the film. Also, the fine-grained film stocks regularly employed for variable area sound recording are blue sensitive, and hence appear to be well suited to use with the highly actinic light from a P15 or equivalent screen. Sufficient light can be made available to properly expose the film, particularly if special techniques are employed. Aluminized screens to direct that light out through the face of the tube, which would otherwise be lost off the rear of the screen, and fluid-filled lenses in contact with the screen to dissipate heat without burning the phosphor. are measures which may be relied upon to assure proper exposure of the film.

An important factor in a practical system in television recording is the matter of film velocity, and the quantity of film that would be required to record programs of normal length. Calculations show that, using a typical film stock, with a resolving power of 170 lines per mm. under conditions of normal development, video information with a band width of 4 to 8 megacycles can be recorded on a 35 mm. film with a film velocity of about 2 to 4 times that normally used for theatre motion picture projection, i. e., about 90 feet per minute. Furthermore, the problem of handling the film with a minimum of jump, weave, and flutter, are very much minimized in the present system since the film moves through the mechanism at constant velocity, and does not require to be stopped or started intermittently as it is in motion picture equipment.

Additionally, it may be mentioned that in certain services where transmission of a D.-C. component in the signal is not important, it may be desirable to incorporate controlled carrier arrangements, whereby the carrier level is automatically adjusted to such a value that it is modulated 100%, whatever the level of the signal to be recorded.

While I have described and illustrated specific forms of the invention it will be clear that variations thereof may be resorted to without departing from the true scope of the invention as defined in the appended claims.

What I claim and desire to secure by Letters Patent of the United States is:

1. A recorder of television signals, comprising, a photo-sensitive strip fed longitudinally at substantially uniform velocity, means for generating a carrier wave having a frequency greater than the highest frequency of said television signals, means for amplitude modulating said carrier wave in response to said television signals to provide a modulated carrier wave, a cathode ray tube having means for generating at least one cathode ray beam, first deflecting means for deflecting said at least one beam in a first direction parallel to the direction of feed of said strip, second deflecting means for deflecting said at least one beam in a second direction transverse to said direction of feed and a fluorescent screen responsive to said at least one beam for generating a spot of light, means for applying said modulated carrier wave to said first deflecting means, means for applying a linear voltage to said second deflecting means, and means for maintaining said spot of light of constant intensity during variations of velocity of deflection thereof.

2. The combination in accordance with claim 1 wherein said last means comprises means for controlling the intensity of said at least one beam in accordance with variations of velocity of deflection thereof.

3. The combination in accordance with claim 1 wherein said television signals comprise a video component and a synchronizing component, and means for synchronizing said linear voltage in response to said synchronizing component.

4. The combination in accordance with claim 1 wherein said television signals comprise a video component, a synchronizing component and a blanking component, and wherein is provided means for synchronizing said linear scan in a first direction in response to said synchronizing signals, means for retracing said beam between linear scans, and means responsive to said blanking component for blanking said beam during said retracing.

5. The combination in accordance with claim 1 wherein is provided means for generating triangular waves having truncated peaks, and means for applying said last named waves to said second deflecting means.

6. A recorder for recording a television signal having a video component, blanking components and synchronizing components, as a variable width constant intensity recording on a linearly fed photo-sensitive tape, comprising, means for generating a high frequency carrier, means for amplitude modulating said carrier in response to said television signal to provide a television modulated carrier, means for generating a spot of light, means for deflecting said spot of light in the direction of feed of said tape in response to said modulated carrier, and means for deflecting said spot of light in successive scans in a direction transverse to said direction of feed in synchronism with said synchronizing component.

7. The combination in accordance with claim 6 wherein is further provided means for maintaining said spot of light of constant intensity during its motions.

8. The combination in accordance with claim 6 wherein said means for generating said spot of light comprises a cathode ray tube, said cathode ray tube comprising a fluorescent screen, and electron beam means impinging on said fluorescent screen.

9. The combination in accordance with claim 6 wherein said means for generating said spot of light comprises a cathode ray tube having a cathode ray beam and a fluorescent screen, and means for modulating the intensity of said beam to maintain constant the intensity of said spot of light during its motions.

10. The combination in accordance with claim 6 wherein said spot of light is deflected in opposite directions transversely of said tape in response to alternate ones of said synchronizing components.

11. The combination in accordance with claim 6 wherein is provided a cathode ray tube having means for generating two cathode ray beams, and a fluorescent screen impinged by said beams to generate said spot, and wherein said beams are operative in succession to impinge on said screen during each of said scans.

12. In a system for recording composite television signals containing blanking, synchronizing and video components on a moving photo-sensitive strip, a cathode ray tube having means for generating a luminous spot and means for moving said luminous spot two coordinate directions in response to two voltages, means for generating a carrier wave, means for modulating said carrier wave in amplitude in response to said composite television signals, means for applying said carrier wave to said cathode ray tube as one of said voltages for moving said luminous spot substantially parallel to the motion of said moving strip, means for generating the second of said two voltages in synchronism with said synchronizing component and for applying said second of said two voltages to effect motion of said luminous spot transversely of said moving strip, means for directing said luminous spot on said photo-sensitive strip.

13. In a system for recording and reproducing television signals having video and synchronizing components, a recorder comprising a photo-sensitive strip moving at uniform velocity, means for generating a flying light spot, means for actuating said light spot transversely of said strip in synchronism with said synchronizing component, means for generating a carrier wave, means for modulating said carrier wave in amplitude at least in response to said video component to provide a modulated carrier wave, means for moving said light spot in the direction of feed of said photo-sensitive strip in response to said modulated carrier wave to produce transverse variable width recordings and a reproducer for said record, comprising, means for generating a further flying light spot, a photo-cell, means for directing said further flying light spot through said photo-sensitive strip to said photo-cell, means for actuating said further flying light spot transversely of said strip, a source of further carrier wave of constant amplitude, and means for actuating said further flying light spot periodically across each of said variable width recordings in response to said further carrier wave of constant amplitude.

References Cited in the file of this patent

UNITED STATES PATENTS

| Number | Name | Date |
|---|---|---|
| 2,047,533 | Von Ardenne | July 12, 1936 |
| 2,356,664 | Gorish | Aug. 22, 1944 |
| 2,373,114 | Goldsmith | Apr. 10, 1945 |
| 2,485,829 | Holst et al. | Oct. 25, 1949 |
| 2,510,121 | Lehmann | June 6, 1950 |